United States Patent [19]

Barnett

[11] Patent Number: 4,754,661
[45] Date of Patent: Jul. 5, 1988

[54] LIMITED SLIP DIFFERENTIAL

[75] Inventor: David W. L. Barnett, Harwood, England

[73] Assignee: Eaton Corporation, Cleveland, Ohio

[21] Appl. No.: 872,066

[22] Filed: Jun. 9, 1986

[30] Foreign Application Priority Data

Jun. 15, 1985 [GB] United Kingdom ............ 8515203

[51] Int. Cl.$^4$ ............................................. F16H 1/40
[52] U.S. Cl. .................................. 74/459.5; 74/713
[58] Field of Search .............. 74/710, 713, 459.5, 74/462, 457

[56] References Cited

U.S. PATENT DOCUMENTS

| | | | |
|---|---|---|---|
| 1,404,505 | 1/1922 | Williams | 74/459.5 |
| 1,455,706 | 5/1923 | Bower et al. | 74/459.5 |
| 3,104,557 | 9/1963 | Baxter, Jr. | 74/459.5 |
| 3,454,394 | 7/1969 | Honobe | 74/459.5 |
| 3,524,361 | 8/1970 | Iyoi et al. | 74/459.5 |
| 3,703,108 | 11/1972 | McCaw | 74/459.5 |
| 3,918,314 | 11/1975 | Osipyan | 74/459.5 |
| 4,273,002 | 6/1981 | Ogasawara et al. | 74/462 |
| 4,640,149 | 2/1987 | Drago | 74/462 |

Primary Examiner—Leslie A. Braun
Assistant Examiner—David Novais
Attorney, Agent, or Firm—H. D. Gordon

[57] ABSTRACT

In order to provide pulsating thrust on vehicle half-shafts during excess differential actions such as occur on spin-outs or skids on ice, the side gear teeth are modified to exhibit two different e.g. involutes on the single tooth engagement zone ($P_1$–$P_2$). Their junction line is a convex discontinuity (Q), the modified teeth becoming thicker. The pinions are typically unmodified.

The pulsating increases friction, which reduces spin-out tendencies. The friction can be increased more by inserting friction rings between the side gears and their bearings.

12 Claims, 7 Drawing Sheets

LIMITED SLIP DIFFERENTIAL

BACKGROUND OF THE INVENTION

The present invention relates to a limited slip differential for transmitting drive differentially to two spaced apart wheels on a vehicle, such as the opposite ends of a drive axle, which may be driven round corners or on skidding surfaces, on-road or off-road.

It is desirable to allow the two wheels to rotate at somewhat different speeds without losing drive torque to either, for instance while cornering or having different tire pressures or tire loadings. Standard differentials serve this purpose well, but if one wheel loses adhesion, e.g. on soft sand or on ice, spin-outs can occur and effective traction can be lost by the driving torque becoming applied only to the skidding or spinning wheel.

The differential housing of a typical drive axle differential is rotationally driven about the axis of the two driven ground wheel shafts. The housing rotates the axles of one or more freely rotating bevel pinions and these engage two side bevel gears rotating with the respective wheels.

An arrangement to allow some but not excessive slip would be thus most desirable. One prior art differential for cars and small trucks senses excessive differential action by responding at low speeds independently (with a fly weight) to a threshold speed difference and bypassing differential action by clutching either or both output axles to the differential housing. This can be unsuited to heavy goods vehicles (HGV's) with high rotating inertias to control. Other attempts propose that the differential gearing driving tooth contactings in the bevel gearing pinion and side gears be not simply root-to-tip but partly transversely across the tooth faces. The resulting variable radius of the contact point is claimed to increase friction between the housing bearing carrying the side-gears and wheel shafts, by increasing the axial thrust always exerted on the driven member in a bevel drive. Even a modest increase in friction (not total locking) is usually quite adequate to regain enough traction to exit the area of unfavorable ground surface. These prior art limited slip/locking differentials operate automatically. Other proposed differentials can be locked by the driver, which leads to damage if the locking is applied impatiently during a spin-out or if not disengaged after use.

The present invention proposes the use of a unique rotational irregularity which causes a desired pulsating action (which increases bearing or clutch friction sufficiently during spin-outs) which will interfere very little with low speed differencing during cornering, and operates satisfactorily on heavy duty vehicles.

GENERAL DESCRIPTION

All bevel gears and pinions exert an axial thrust load on the driven members by virtue of the geometry. The higher the pitch angle the higher the axial thrust load. This means that differential side gears with greater numbers of teeth and therefore a higher pitch angle tend to produce higher axial thrusts. The invention takes advantage of the axial thrust to apply selective but automatically increased pressures between the backfaces of the differential side gears and the differential case to produce a frictional braking action.

The differential gears according to the preferred embodiments of the invention are designed conventionally except that the face apex passes through the pitch apex to ensure a constant profile contact ratio from toe to heel. The number of teeth in the side gear should also be divisible by the number of differential pinions, otherwise the desired pulsating action becomes more or less dissipated. One member has teeth cut with a normal profile to the designed pressure angle whilst the other member is cut with a modified profile from normal in order to produce a change in the pressure angle of mesh during each tooth engagement. This profile modification can be accomplished in many different ways using non involute or involute profiles and could equally be applied to either or both members (i.e the differential pinions and differential side gears); the present preference is to use two involute curves meeting at a convex portion or ridge transverse to the progression of tooth contact; the two involutes are applied to each flank of each tooth of each side gear member, and not the pinion or pinions, because it is easier to cut complicated profiles on the side gear teeth. Also application of the invention to the pinions tends to undercut the teeth, weakening them at the roots.

At the start and finish of single tooth contact the modified profile preferably coincides with the normal tooth profile in embodiments to ensure smooth transfer of motion to the next tooth. In FIG. 1, $P_1$ and $P_2$ are the points of start and finish of single tooth contact. The object of the profile modification is to bring about a change during each tooth engagement in the axial thrust force exerted through the side gear, normally accompanied by a change in velocity, which changes in turn each produce a pulsation during differential action to resist wheel spin by bearing friction between the side gear and the differential case. Friction can be increased by the use of multiple clutch plates for better performance if desired.

Although the pulsation action will be present during any differential action, at low differential speeds such as would be encountered under normal cornering the effect would be marginal. However, when a single wheel spin occurs, the effect will be to transfer motion to the stationary wheel to regain traction. The main advantages of the proposed invention are:

1. It can be used in existing differential carriers without the need of new designs to cases. The modified side gears can be substituted for the normal ones, in new or old differentials.
2. As only one member requires modification, existing gears can be used.
3. The design utilizes the full facewidth of the gears throughout each tooth engagement, therefore no loss of strength and no requirement to increase facewidth.
4. The differential side gears and pinions can easily be produced by precision forging which makes for economical manufacture except for cutting the master modified gear (usually the side gears).

For systems allegedly relying on variable leverage in the prior art, U.S. Pat. No. 3,703,108, the disclosure of which is hereby incorporated by reference, reviews other such systems and proposes an arrangement wherein each tooth-to-tooth contact between the pinion and side gears move along the side gear tooth (as well as from tip to root) whenever any differential action occurs. This proposal claims to result in time-varying leverages and torques in the drive to each wheel. Moreover the geometry is chosen so that at nearly all instants the torques are claimed to be different to each wheel. For the present invention, it was desired to avoid contact progressing other than direct from tip to root, for ease of manufacture.

The proposal of U.S. Pat. No. 3,703,108 brings about this assymmetry and longitudinal movement of the tooth contact point by dimensioning one or more of the cones which define all bevel gear geometry, to have its apex non-coincident with the centre point of the differential. Another limited slip effect is produced by the so-called "tight" differential in use by Eaton Corporation wherein axial thrust is increased by use of oversized teeth (and/or reduced end-play in the side-gear bearings). However, wear reduces the limited slip action and friction is increased during cornering which may be undesirable.

As with most gear meshing, the present invention requires in each meshing pair of gears, a degree of overlapping of drive between tooth pairs. Therefore, for part of the time only one tooth pair participates, and for the rest of the time two pairs share the drive.

Accordingly it is essential to the invention that the number of engaged tooth pairs lie between one and two. During the active driving part of each tooth flank, there will thus be a single tooth drive portion and, each side of the latter, drive portions that overlap in time with driving by another tooth pair.

According to presently preferred embodiments of the invention, the pinion teeth flanks follow an involute, or substantially involute, curve of conventional form and pressure angle. Many parameters can be varied as is well known, but for optimum performance a nominal pressure angle of 25° has been chosen, and the following description will allude to "normal" side gear teeth as a reference to clarify the modifications of the invention. To the normally skilled designer, their (unmodified) flanks would be "normally" conformed specifically to cooporate with the involute pinion teeth. Embodiments modify the side gear teeth, and the following description will reference the modified teeth with normal teeth, so that the skilled man will readily appreciate the modification taught by the invention. In practice, modified and unmodified side-wheels will usually be interchangeable.

The modified side gear tooth in one inventive aspect comprises a thickening of the tooth as its single-tooth drive portion and a thinning of the tooth in its two overlapping drive portions, in relation to a normal tooth, the modification being preferably such that the two limits of the single tooth drive portion (hereinafter called "$P_1$" and "$P_2$") are crossover points, in that they are coincident with those limits on a normally cooperating side tooth. The contour in the preferred tooth crosses over so that the thickening becomes thinning immediately outside the single tooth drive portion $P_1P_2$ (see FIG. 1).

Therefore the pressure angle of drive and the transmitted rotational speed to the side gear, and most significantly the axial thrust through the side-gear, will change once during each tooth-pair engagement, which causes pulsating. This pulsating only occurs during differential action, i.e. assymmetry in the drive (or suspension, tyres etc) of the vehicle. The pulsating axial thrust will increase friction at the differential housing bearing with the output or side gear shafts, and slip will thus be limited even if one ground wheel encounters a zero friction surface (eg wet ice).

Further objects, features and advantages, of the present invention will appear from the following description of embodiments thereof, given in conjunction with the drawings.

BRIEF DESCRIPTION OF THE PREFERRED EMBODIMENT

Figure 7:
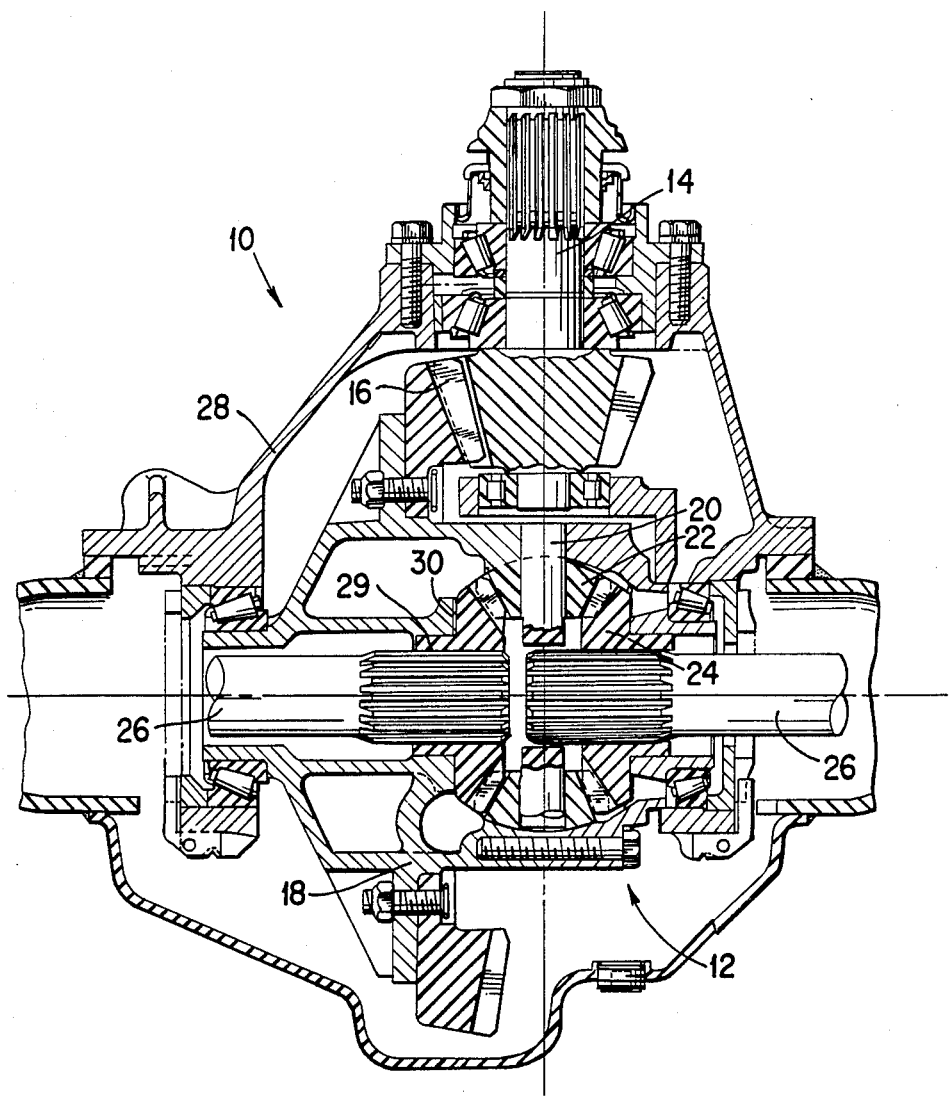
FIG. 7 is a sectional view of a drive axle including a differential gear set.

A typical drive axle 10 of the type utilizing a bevel gear differential gear set 12 can be seen by reference to FIG. 7. Drive axle 10 includes a drive pinion 14 meshingly engaged with a ring gear 16. Ring gear 16 is fixed to a differential housing 18 which carries the differential spider 20 upon which the differential driving pinions 22 are rotatably carried to mesh with the differential side gears 24. Axle shafts 26 are splined to the side gears and extend outwardly from the axle housing 28 for driving the vehicle wheels (not illustrated). The side gears 24 are provided with hubs 29 and washers 30 to provide a thrust bearing between the side gears and housing 28 allowing the side gears 24 to rotate in differential housing 28.

In general, gear teeth engagement surfaces are involute curves, and tooth-to-tooth engagement commences and finishes gradually, between which there is a rolling together motion (i.e. rolling rather than sliding) between surfaces, the tangent to which, at one radius i.e. at the "pitch circle", is inclined at a constant "pressure angle" to the radius of the tooth. This pressure angle is often 22.5°, presently preferred herein is 25°. Every bevel gear wheel has a base circle or cone (from which the involute curve is derived), a root cone (roots of teeth), a top or outside cone (i.e. tips of teeth), and a pitch cone, where the two engaging gears move identically at the engagement area, i.e. as though rolling together. All the cone apices typically coincide at the centre of the differential, but not in the invention of U.S. Pat. No. 3,703,108 (McCaw) referred to above. The presently proposed modified teeth each has two component involute curves, two pressure angles averaging to say 25° (and two base cones) relating to each flank. For acceptable noise and wear, one mating tooth pair must always be in mesh but never more than two. Preferred embodiments of the invention select he contact ratio at 1.3.

Figure 1:
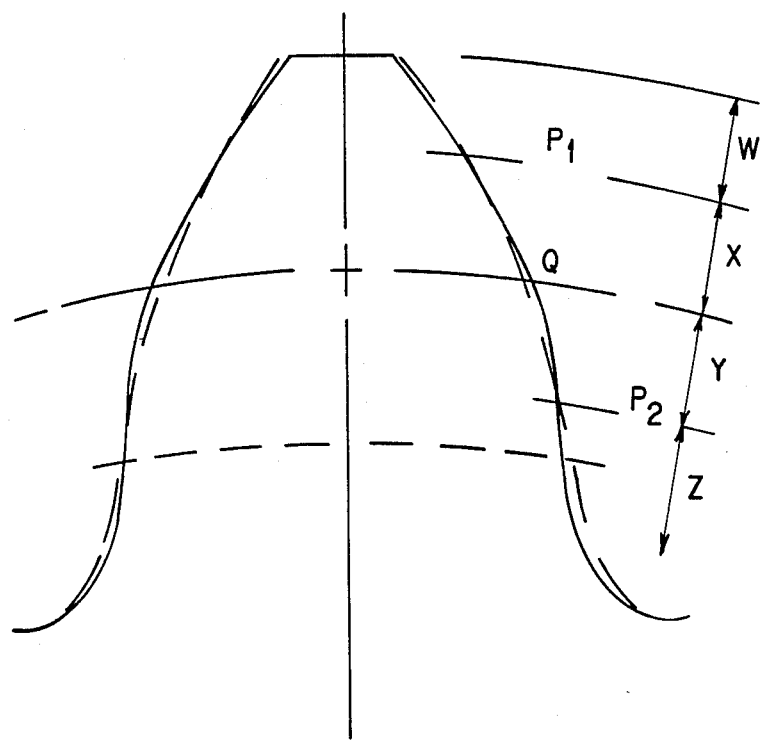
FIG. 1 shows a side view of a side gear tooth, illustrating the engaging flanks and the modifications compared with a normal single involute-curved tooth.
Figure 2:
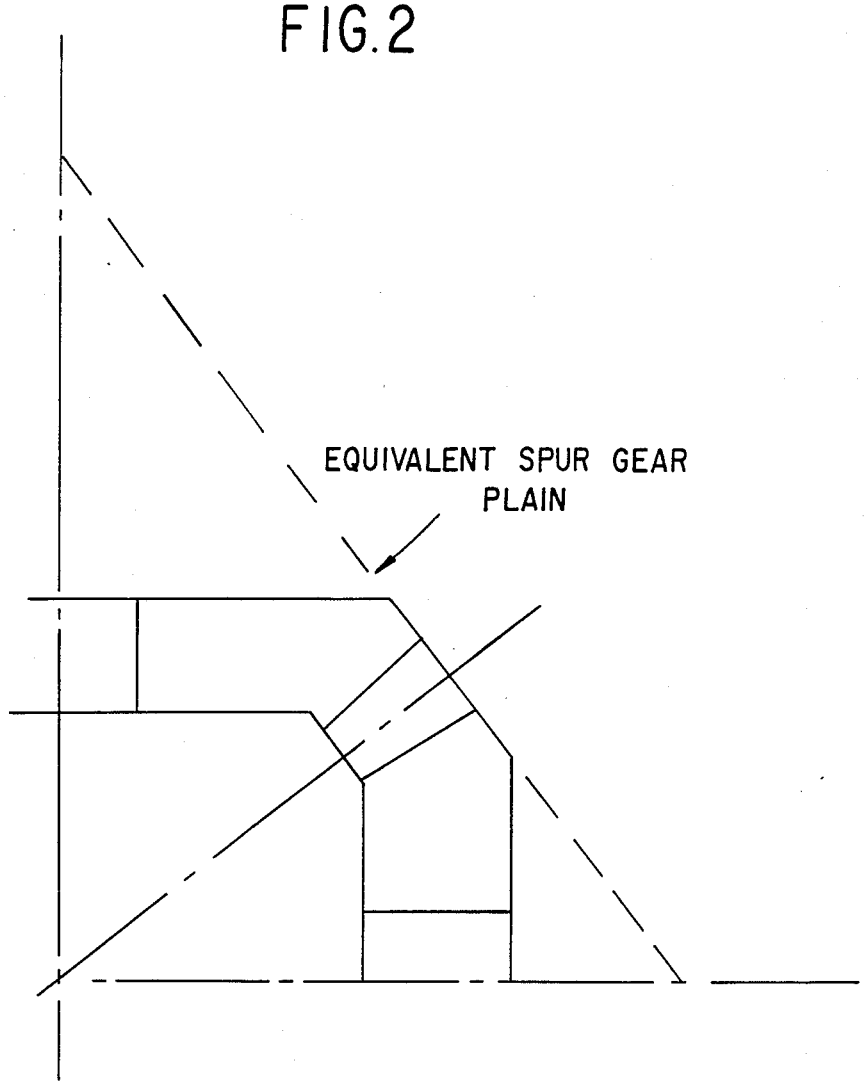
FIG. 2 shows a spur gear equivalent to the bevel gear, in a plane as viewed from the bevel cone apex.

Referring to FIG. 1, the two side gears of a differential have modified teeth as shown in full line form. "Normal" or reference teeth would have the dashed line form, and have one involute curve from the tip down to the point on the flank where the tip of the meshing pinion gear tooth ceases contact therewith. In FIG. 1, this one involute curve extends radially to an extent $W+X+Y+Z$. This so called "normal" tooth assumes none of the well-known foreshortening from the theoretical maximum commonly practised in order to avoid noise due to contact at points or corners of the tip. With the preferred 1.3 contact ratio, the radial distances W and Z correspond to two-teeth meshing, and X and Y to single-tooth meshing. For this embodiment, the single-tooth meshing boundary points $P_1$ and $P_2$ are chosen (by calculation for a "normal" tooth) since points $P_1$ and $P_2$ are to coincide on the modified and unmodified teeth.

To design the side gear teeth profiles, points $P_1$ and $P_2$ common to "normal" teeth are determined to be conjugate with a first involute, that of the pinion, then the tooth profiles are cut away at W and Z according to second and third involutes. The result is that firstly over the radial extents W and X, the pressure angle is increased corresponding to the second, involute curve from the tip through $P_1$ to point Q, and secondly, over the radial extents Y and Z, the pressure angle is decreased compared with that of the normal tooth, corresponding to use of the third involute curve from Q through as far as Z (towards the root).

Thus the invention provides two separate pressure angles and involute curves, and a discontinuity at point Q, which may be very sharp or somewhat sharp according to choice, noise, wear etc. During any differential action, when each tooth engagement passes through Q, the aforesaid velocity transmission, pressure angle and axial thrust pulsations occur in the driven side gear.

As far as the invention is concerned, any tooth shape may be chosen outside $P_1$, $P_2$ to ensure thinning of the teeth, and over the single tooth meshing section between $P_1$, $P_2$ to ensure thickening of the teeth. The thickened or convex section causes (at least) two different pressure angles to be identifiable. The tooth strength, reproducibility, noise factors, smooth take-up of stress, and the like are selected in accordance with usual gear design practices. It is not likely that substantially non-involute curves would be engineeringly practical for the modified teeth, and so the choice to two involutes, namely the second and third involutes described above with a junction line at Q, will give the most economical satisfactory solution.

It is repeated that during sections W and Z engagements, driven tooth velocities are reduced by the difference in the involute curve position from the normal involute position (dashed line) in FIG. 1. During section X and Y engagement, tooth mesh motion is increased corresponding to the difference in involute position i.e. the difference between the dashed and full line. The average, as taken between $P_1$, $P_2$, of the two involutes is conjugate with the pinion member produced with a standard involute curve of pressure angle Cp. The modified side gear involute curves, of pressure $\phi_1$ and $\phi_2$ coincide with a normal conjugate tooth at points $P_1$ and $P_2$ only.

METHOD OF DESIGN

The gear in question is usually of the straight bevel variety but could be "Zerol" bevel (The Gleason Works registered trademark), eg designed in accordance with normal bevel gear practice such as A.G.-M.A. or Gleason Works recommendation. The face cone should desirably pass through the pitch apex to ensure a constant profile contact ratio from toe to heel, with the root cone of the mating part parallel to the face cone to enable maximum root radius and maximum strength.

Example

| | | |
|---|---|---|
| Number of teeth 'N' | 9 | 12 |
| Diametral pitch 'DP' | 3.143 | |
| Pressure angle '$\phi$' | 25° | |
| Outer cone distance 'Ao' | 2.38625517" | |
| Facewidth 'F' | .941" | |
| Pitch angle 'T' | 36°.86989 | 53°.13010 |
| Addendum | .3425 | .2892 |
| Dedendum | .3536 | .4070 |
| Add angle '$\delta a$' | 8°.16789 | 6.9102 |
| Face angle | 45°.03779 | 60.0403 |
| Root angle | 29°.95969 | 44.9622 |
| Outside diameter | 3.4115 | 4.16504 |
| Pitch apex to crown | 1.7035 | 1.2004 |

All the above are to standard bevel design except that the face angle is designed to pass through the pitch apex and not the root angle.

All calculations are carried out in the equivalent spur gear plane at the mean cone distance (i.e. the distance along the theoretical pitch cone from the apex to the middle of the face width).

Equivalent number of teeth = $N/\cos \tau$
Therefore
$N_{pe}$ = 9/Cos 36.86989 ≈ 11.25
$N_{ge}$ = 12/Cos 53.13010 ≈ 20

$$DP_e = \frac{DP \times Ao}{(Ao - F/2)} \approx \frac{3.143 \times 2.386255}{[2.386255 - .941/2]} \approx 3.91490$$

| | | |
|---|---|---|
| No of teeth equ. | 11.25 | 20 |
| $DP_e$ | 3.9149 | |
| Pressure angle | 25° | |
| Pitch circle dia '$Ne/DP_e$' | 2.8736366 | 5.108687 |
| Base circle dia equ. | 2.604399 | 4.630043 |
| Centre distance equ. | 3.9911619 | |
| Outside dia equ. | 3.4235 | 5.5730 |
| Base pitch $\frac{\pi \times \cos e}{DP_e}$ | .727285 | |

Where:
$N_e$ = equivalent number of teeth,
$N_{pe}$ = equivalent number of teeth pinion gears,
$N_{ge}$ = equivalent number of teeth side gear, and
$DP_e$ = equivalent diametrical pitch.

Figure 3:
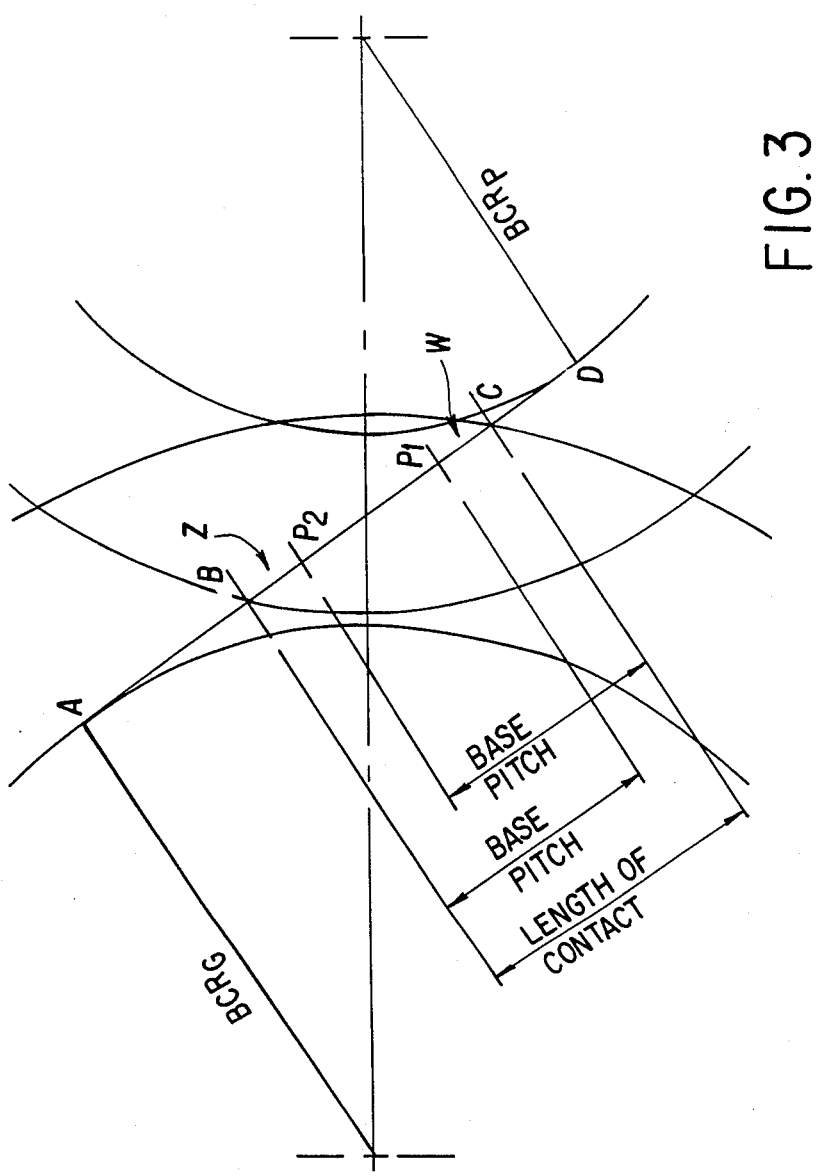
FIG. 3 is a gear teeth interaction diagram illustrating the inventive modifications.
Figure 4:
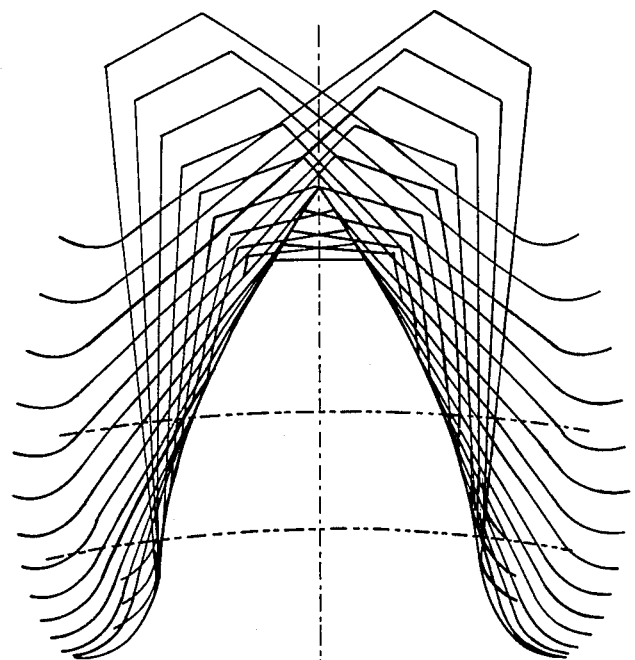
FIGS. 4, 5 and 6 show respectively a pinion tooth, a standard side gear tooth unmodified by the invention, and the tooth as so modified, and successive positions of the cutter of the blank for forging.
Figure 5:
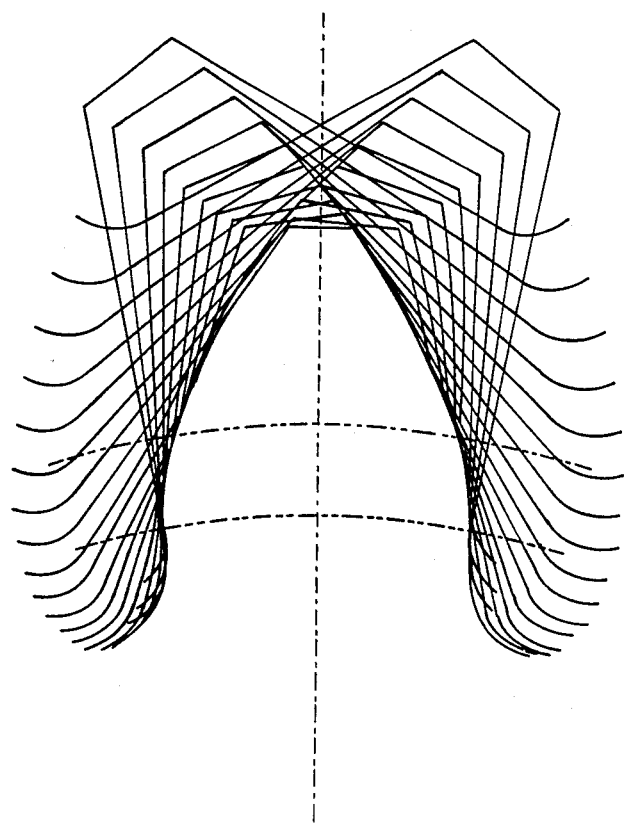
Figure 6:
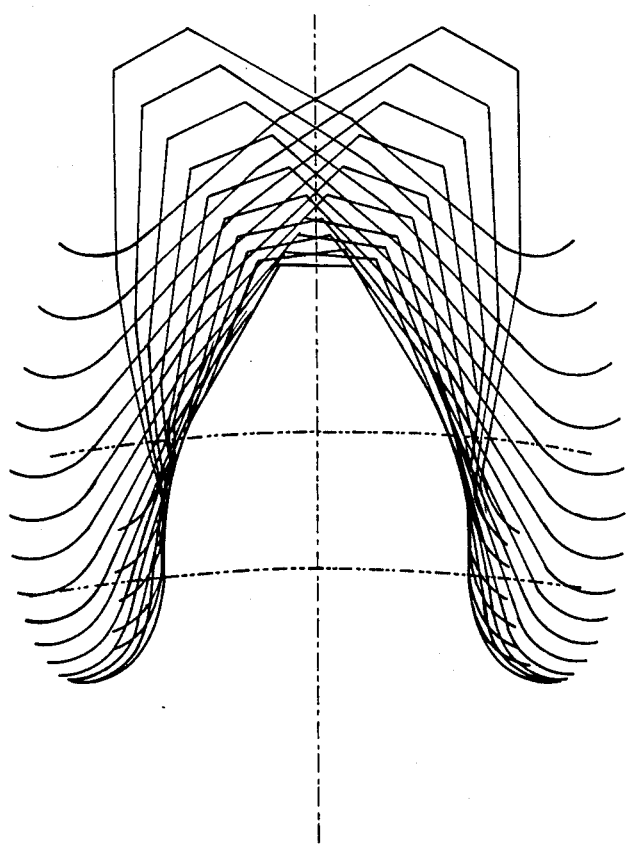

In more detail, to design the start and finishing engagement points $P_1$, $P_2$, reference is made to FIG. 3, AD being the "line (or path) of action" tangential to the "base circles" used to define the involutes of *normal* side gear teeth (before modification).

To clarify the modification, $BP_2$ must be modified for shortening (the radial extent Z in FIG. 1), likewise $CP_1$ (section W).

On the line of action, these lengths are equal, and $BP_1$ or $AP_2$ equals the base pitch. $P_1$ and $P_2$ correspond with those points in FIG. 1.

The gears should be designed with a profile contact ratio of 1.2 to 1.4 as this will ensure correct operation and smooth transmission under normal operation.

To establish the profile contact ratio and start and finish of single tooth contact.

$$\text{Profile contact ratio} = \frac{\text{Length of Contact}}{\text{Base Pitch}} = \frac{BC}{\text{Base Pitch}}$$

$$AC = \frac{\sqrt{OD_G^2 - BCD_G^2}}{2} = \frac{\sqrt{5.5730^2 - 4.630043^2}}{2} = 1.550889$$

-continued $$BD = \frac{\sqrt{OD_P{}^2 - BCD_P{}^2}}{2} = \frac{\sqrt{3.4235^2 - 2.604399^2}}{2} = 1.1110196$$

AD = CENTRE DISTANCE × SIN ¢ = 3.9911619 × SIN 25 = 1.6867379
BC = AC + BD − AD = 1.550889 + 1.1110196 + 1.6867379 = .97517
THEREFORE CONTACT RATIO = .97517/.727285 = 1.3408

In order to avoid under cut with low tooth numbers, the side gear is chosen to be modified, but similar modification on the pinion instead would produce a similar pulsing axial thrust through the side gear.

It is now necessary to calculate the diameter at start and finish of single tooth contact ($P_1$ & $P_2$) and hence the thickness at these points of the standard gear profile.

The design chosen uses a standard pressure angle of 25° which is modified to 20° at the root and 30° at the tip to achieve the required motion.

Dia @ $P_2$ on the gear = $2 \times \sqrt{(AB + P_G)^2 + BCR^2}$ =

(5.4.85)

$2 \times \sqrt{(.5757 + .72728)^2 + 2.31502^2} = 5.313033$

Dia @ $P_1$ on the gear = $2 \times \sqrt{(AC - P_G)^2 + BCR^2}$ =

$2 \times \sqrt{(1.550889 - .72728)^2 + 2.31502^2} = 4.914325$

Thickness at $P_2$ on Gear $$\phi p1 = \cos^{-1}\left[\frac{BCD_G}{DIA\ P_2}\right] = 29°\ .372410$$

$$T_{P2} = \left(\frac{TN}{PCD} + INV¢ - INV¢\right) \times DIA\ P_2 =$$

$$\left(\frac{.3763}{5.1087} + .029975 + .050191\right) \times 5.313033 = .28394$$

Thickness at $P_1$ on Gear $$\phi_{P1} = \cos^{-1}\left(\frac{BCD}{DIA\ P_1}\right) = 19.58377$$

$$TP1 = \left(\frac{.3763}{5.1087} + .029975 - .0139635\right) \times 4.914325 = .44067$$

In order to manufacture the gear we must determine the thickness at the generating pitch circle for each pressure angle.
Therefore TN FW 30°
BCD = 5.108687 × COS 30° = 4.424253

$$\phi P_{230} = \cos^{-1}\left(\frac{4.424253}{5.313033}\right) = 33°\ .62113837$$

$$TN_{30} = \left(\frac{.28394}{5.313033} + .07813077 - .05375149\right) \times 5.108687$$

$TN_{30} = .39756$
TN for 20°

-continued $BCD_{20} = 5.108687 \times \cos 20° = 4.8005957$ $$\phi P_{120} = \cos^{-1}\left(\frac{4.8005957}{4.914325}\right) = 12°\ .35045$$

$$TN_{20} = \left(\frac{.44067}{4.914325} + .0034018 - .01490438\right) \times 5.108687$$

$= .39933$

Reference is now made to FIGS. 2, 4, 5 and 6 (FIG. 6 being the modified tooth), for design details of a preferred modified side gear tooth. Since differentials will almost invariably operate reversibly, the other flank of each side tooth will have the mirror image profile of the first modified flank (in the bisecting radius).

(a) VARIABLE PRESSURE
THURST FORCE ON SIDE GEAR TF
TF = FT × TAN $\phi$ × SIN ($\tau$)
WHERE FT = TANGENTIAL TOOTH LOAD
$\phi$ = PRESSURE ANGLE OF MESH
$\tau$ = PITCH ANGLE As the gears will be operating at varying pressure angle of mesh between $\phi_1$ and $\phi_2$ then the FLUCTUATION OF THRUST LOAD STF IS $$STF = FT \times \sin \tau \times [TAN\ \phi_1 - TAN\ \phi_2]$$

(b) VARIABLE SPEED

Since the pinion member has a constant pressure angle $\phi_p$, the variation in motion transmitted to the side gear as the gears pass through one tooth mesh can be calculated by comparing the "normal" side gear tooth form based on $\phi_p$ with the modified one.

VARIABLE BRAKING ACTION $$\phi_{M2} = \cos^{-1} \frac{5.108687 \times \cos 30 + 2.8736366 \times \cos 25}{2 \times 3.9911619}$$

$= 28°\ .29399$ $$\phi_m = \cos^{-1} \frac{5.108687 \times \cos 20 + 2.8736366 \times \cos 25}{2 \times 3.9911619}$$

$= 21°\ .9249$

Therefore TF = FT × SIN 53° .13 × [TAN 28.29 − TAN 21.9]
= FT × .1086

TABLE 1

| PREFERRED GEAR DESIGN | | |
|---|---|---|
| | DRIVER | DRIVEN |
| SET IDENTIFICATION NUMBER | 101.0010 | |
| IDENTIFICATION NUMBER | 101.0000 | 101.0000 |
| NUMBER OF TEETH | 11.26 | 20 |
| D.P. NORMAL | 3.9149 | |
| PRESSURE ANGLE NORMAL | 25.0000 | |
| HELIX ANGLE | | |
| CENTRE DISTANCE | 3.9912 | |
| FACEWIDTH | 1.0000 | 1.0000 |
| OUTSIDE DIA | 3.4235 | 5.5730 |
| PITCH CIRCLE DIA | 2.8736 | 5.1087 |
| ROOT DIA | 2.3057 | 4.4552 |
| T.I.F. DIA | 2.6181 | 4.7699 |
| TOP OF FILLIT | 2.6152 | 4.7243 |
| BASE CIRCLE DIA | 2.6044 | 4.6300 |
| CIRCULAR THICKNESS | .4162 | .3763 |
| TOP LAND NO TIP CHAMFER | .0957 | .1335 |

TABLE 1-continued

PREFERRED GEAR DESIGN

| | DRIVER | DRIVEN |
|---|---|---|
| ROOT CLEARANCE MIN | .0477 | .0477 |
| BALL/PIN DIAMETER FOR (MOP) | .5000 | .5000 |
| MIN SIZE OVER 2 PINS | 3.6403 | 5.8536 |
| MIN SIZE OVER 2 TEETH | 1.1826 | |
| MIN SIZE OVER 3 TEETH | | 1.9344 |
| PRESSURE ANGLE MESH | | 24.9999 |
| HELIX ANGLE MESH | | |
| PROFILE CONTACT RATIO MAX | | 1.3441 |
| PROFILE CONTACT RATIO MIN | | 1.3146 |
| FACE CONTACT RATIO | | 1.0000 |
| NO. OF TEETH IN CONTACT | | 1.3146 |
| LOAD SHARING RATIO | | 1.0000 |
| LOAD DIA | 3.1372 | 5.3229 |
| PITCH CIRCLE DIA MESH | 2.8736 | 5.1087 |
| BASIC RACK INFORMATION FOR REF ONLY | | |
| HOB PRESSURE ANGLE | 25.0000 | 25.0000 |
| HOB WHOLE DEPTH | .5589 | .5589 |
| HOB ADDENDUM | .3000 | .3000 |
| HOB THICKNESS | .4012 | .4012 |
| HOB TIP RADIUS | .0950 | .0950 |
| HOB PROTUBERANCE | | |

TABLE 2

PREFERRED GEAR DESIGN

| | DRIVER | DRIVEN |
|---|---|---|
| SET IDENTIFICATION NUMBER | 101.0010 | |
| IDENTIFICATION NUMBER | 101.0000 | 101.0000 |
| NUMBER OF TEETH | 11.25 | 20 |
| D.P. NORMAL | | 3.9149 |
| PRESSURE ANGLE NORMAL | | 25.0000 |
| HELIX ANGLE | | |
| CENTRE DISTANCE | | 3.9912 |
| FACEWIDTH | 1.0000 | 1.0000 |
| INPUT TORQUE FT LBS | 100.00 | 177.78 |
| INPUT SPEED R.P.M. | 1000.00 | 562.50 |
| TANGENTAL LOAD (LBS) | | 835.18 |
| TANGENTAL LOAD/INS OF FACE | | 835.18 |
| RADIAL LOAD (LBS) | | 389.45 |
| THRUST LOAD (LBS) | | |
| NORMAL LOAD (LBS) | | 921.52 |
| PITCH LINE VELOCITY (FPM) | | 752.32 |
| BENDING STRESS A.G.M.A. @ 100% | 8894.4 | 8469.3 |
| BENDING HOURS A.G.M.A. | 10000.0 | 10000.0 |
| BENDING STRESS K.P. @ 100% | 11150.8 | 10673.4 |
| BENDING HOURS K.P. | 10000.0 | 10000.0 |
| BENDING STRESS ALM & ST | 8275.5 | 6859.4 |
| BENDING HOURS ALM & ST | 10000.0 | 10000.0 |
| PITTING STRESS HANSON @ 100% | | 159559.6 |
| PITTING HOURS HANSON 8620 | 40099.7 | 7128.3 |
| PITTING HOURS HANSON 20 MN CR 5 | 10000.0 | 10000.0 |
| PITTING STRESS A.G.M.A. @ 100% | | 139373.5 |
| PITTING HOURS A.G.M.A. | 10000.0 | 10000.0 |
| PITTING STRESS HUFFAKER @ 100% | | 111268.9 |
| PITTING HOURS HUFFAKER | 10000.0 | 10000.0 |
| PITTING STRESS I.S.O. @ 100% | | 111268.9 |
| PITTING HOURS I.S.O. | 10000.0 | 10000.0 |

The preferred parameters are given by way of example. Even totally non-involute teeth meshings, between unity and two contact ratio, and having a convex discontinuity on each single-tooth contact face of one tooth set should give some of the inventive advantages.

I claim:

1. A limited slip differential (12) utilizing gear teeth having modified gear tooth profiles comprising;
   a housing rotatable by a prime mover;
   at least one driving pinion (22) mounted to be freely rotatable about its own axis in the housing;
   two parallel driven side gears (24) rotatably mounted in said housing by side gear bearings (29–30);
   first bevel gear teeth on the pinion for meshing with second bevel gear teeth on the side gears during differential action, a contact ratio of meshing of said first and second gear teeth during differential action selected to be between one and two;
   said differential gear tooth profile modification characterized by:
   at least one of said first and second gear teeth being modified relative to corresponding unmodified (dashed contour, FIG. 1) gear teeth by having a two-part profile comprising a first (X) and a second (Y) part defining a discontinuity line (Q) at the intersection thereof, said intersection occurring within the single-tooth meshing contact boundaries ($P_1$, $P_2$) of said modified tooth which boundaries substantially correspond with the single tooth meshing contact boundaries of corresponding unmodified gear teeth, the two different profile parts (X,Y) extending from the discontinuity line (Q) through the single-tooth contact boundary lines ($P_1$, $P_2$) and thence through the double-tooth meshing contact zones (W, Z), said first (X) and second (Y) parts of the modified gear tooth profile defining different pressure angles of mesh ($\phi_1$, $\phi_2$) to produce differing first and second axial thrust forces on each side gear; whereby
   for any speed of differencing, the first and second axial forces are different; and whereby
   each tooth meshing causes an axial thrust force pulsation on the side gear bearings,
   the average pressure angle of mesh of the two different profiles (eg ($\phi_1 + \phi_2$)/2 corresponding to the pressure angle of mesh of that profile which could have been chosen for a corresponding unmodified tooth to be conjugate with teeth of the other set of gear teeth.

2. A limited slip differential according to claim 1, characterized in that the side gear bearings comprise friction increasing members arranged to respond to axial thrusts.

3. A limited slip differential according to claim 2, wherein the number of second gear teeth is a whole number multiple of the number of driving pinions (22) meshed with said side gears (24).

4. A limited slip differential according to claim 2, characterized in that the pinion teeth are normal, and the side gear teeth are modified, whereby undercutting at the root region is avoided.

5. A limited slip differential according to, claim 4 characterized by a tooth meshing contact ratio of about 1.3.

6. A limited slip differential according to claim 4, wherein the number of second gear teeth is a whole number multiple of the number of driving pinions (22) meshed with said side gears (24).

7. The limited slip differential of claim 6, wherein said first gear teeth are of a generally generated involute profile and the single tooth contact portions of said second gear teeth are of profile defined by two different convex ridge transverse to the progression of meshing tooth contact.

8. The limited slip differential of claim 4, wherein said first gear teeth are of a generally generated involute profile and the single tooth contact portions of said second gear teeth are of profile defined by two different convex ridge transverse to the progression of meshing tooth contact.

9. A limited slip differential according to claim 1, characterized in that the pinion teeth are normal, and the side gear teeth are modified, whereby undercutting at the root region is avoided.

10. The limited slip differential of claim 9, wherein said first gear teeth are of a generally generated involute profile and the single tooth contact portions of said second gear teeth are of profile defined by two different convex ridge transverse to the progression of meshing tooth contact.

11. A limited slip differential according to claim 9, wherein the number of second gear teeth is a whole number multiple of the number of driving pinions (22) meshed with said side gears (24).

12. The limited slip differential of claim 11, wherein said first gear teeth are of a generally generated involute profile and the single tooth contact portions of said second gear teeth are of profile defined by two different convex ridge transverse to the progression of meshing tooth contact.

* * * * *